United States Patent

[11] 3,611,874

| [72] | Inventors | Charels A. Larsen<br>Union Grove;<br>Harvey W. Zimmerman, Racine; J. L. Dye,<br>Racine, all of Wis. |
|---|---|---|
| [21] | Appl. No. | 8,782 |
| [22] | Filed | Feb. 5, 1970 |
| [45] | Patented | Oct. 12, 1971 |
| [73] | Assignee | Gorton Machine Corporation<br>Racine, Wis. |

[54] COMBINED NUMERICAL AND TRACER
CONTROL SYSTEM FOR MACHINE TOOLS
6 Claims, 3 Drawing Figs.

[52] U.S. Cl. ..................................................... 90/13 C,
90/13.5, 318/578
[51] Int. Cl. ....................................................... B23c 1/16,
G05b 19/36
[50] Field of Search ........................................... 90/13 C,
13.5; 318/578

[56] References Cited
UNITED STATES PATENTS

| 3,002,115 | 9/1961 | Johnson et al. ............... | 90/13 C X |
| 3,101,436 | 8/1963 | Younkin ........................ | 90/13 C |

Primary Examiner—Gil Weidenfeld
Attorney—James E. Nilles

ABSTRACT: A control system for a machine tool having three mutually perpendicular axes along which elements of the machine tool are movable. The control system includes a numerical control for controlling movement of the machine tool elements along two of the axes. The control system further includes a tracer control operable by the numerical control for controlling the machine tool elements along the third axis of the tool.

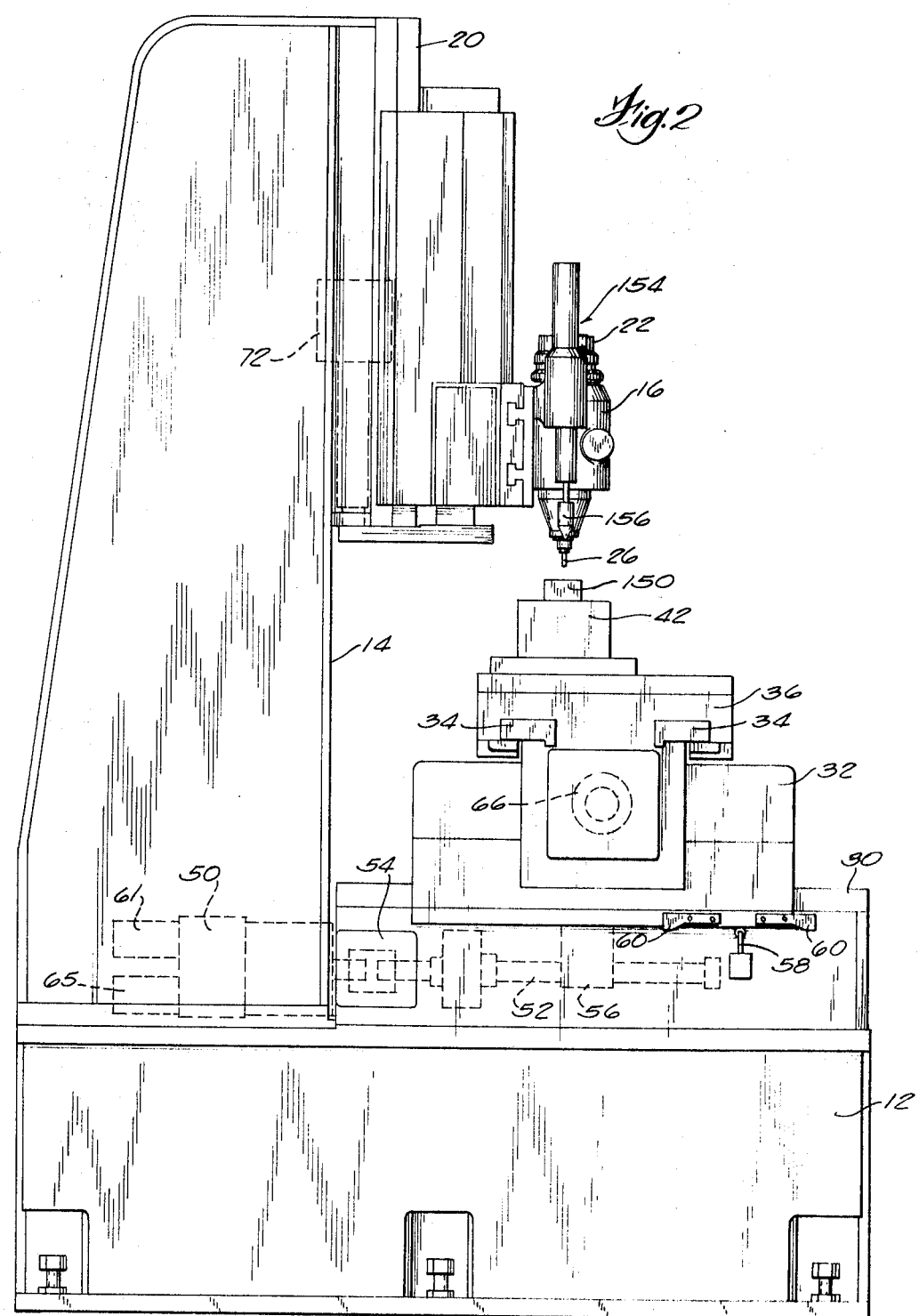

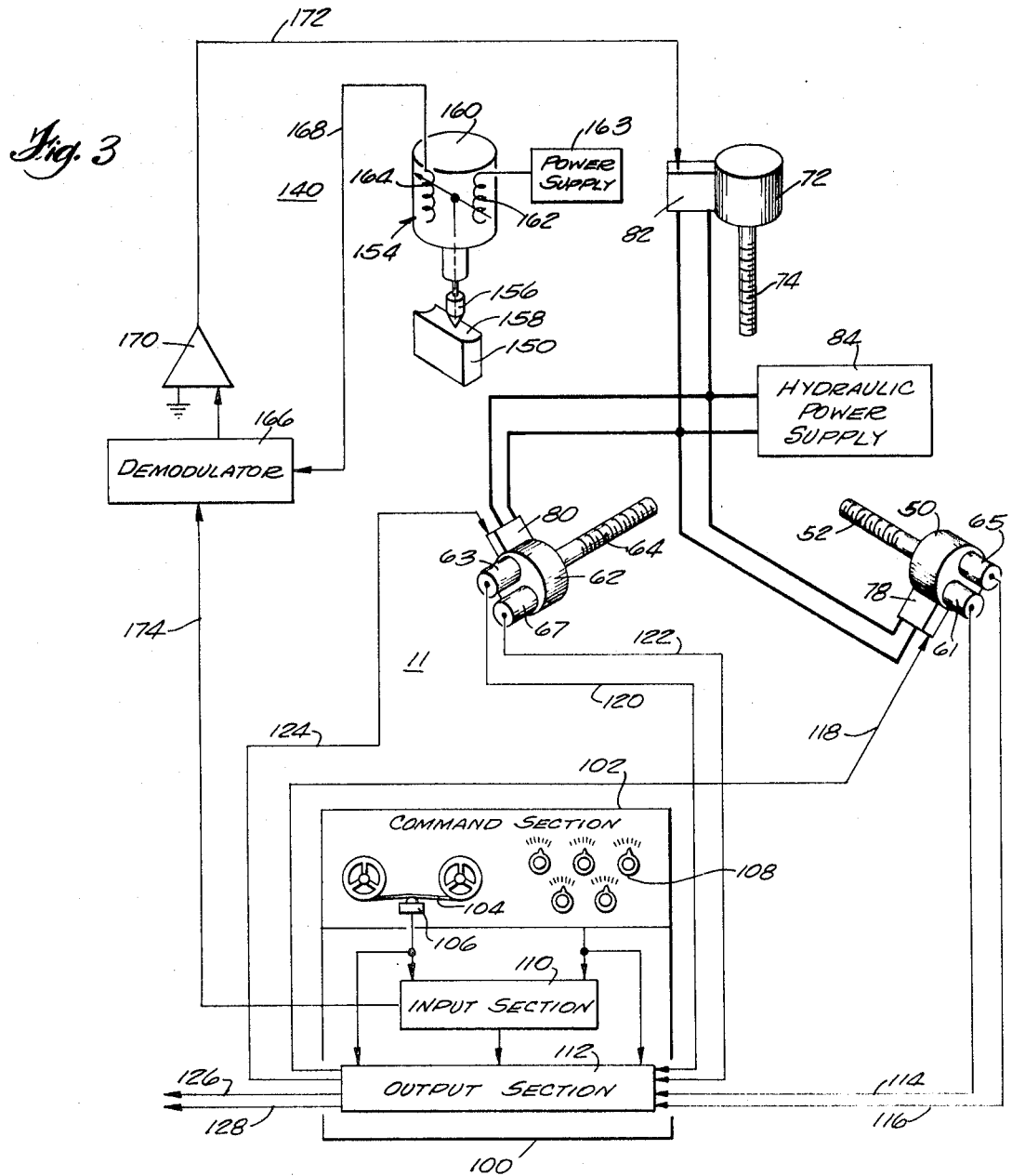

COMBINED NUMERICAL AND TRACER CONTROL SYSTEM FOR MACHINE TOOLS

BACKGROUND OF THE INVENTION

1. Field of the Invention

The present invention relates to apparatus for regulating the operation of machine tools and more particularly to such apparatus incorporating both numerical control and tracer control elements.

2. Description of the Prior Art

The control system of the present invention is designed for use with a machine tool in which the cutting tool, such as a milling cutter or drill, and a workpiece are movable with respect to each other along three mutually perpendicular intersecting axes. For instance, the tool and the workpiece may be relatively moved with respect to each other up and down along a vertical axis, relatively moved with respect to each other back and forth along a horizontal axis perpendicular to the vertical axis or relatively moved toward and away from each other along a horizontal axis perpendicular to both of the preceding axes. In the art, the vertical axis is termed the Z-axis when the spindle is in a vertical position of the machine tool, one of the horizontal axis termed X-axis and the horizontal axis perpendicular to both the Z and X axes termed the Y-axis.

In a typical machine tool of the type with which the present invention may be utilized, the cutting tool is mounted for movement along the Z-axis generally in a spindlehead containing a rotating tool holder. The workpiece is stationary along this axis. The workpiece is mounted for movement in both the X and Y axes while the cutting tool is stationary along these axes.

Where the cutting tool and the workpiece come in contact along any of the axes of the machine tool, a cutting operation is performed on the workpiece. For example, a cutting tool in the form of a milling cutter and a workpiece comprised of a pushbutton having a curved surface on which characters, such as letters, are to be milled or engraved, may be moved toward each other along the Z-axis of the machine tool to place the milling cutter in contact with the curved surface of the pushbutton. The button is then moved by the X and Y axes to perform the milling operation, while the Z-axis maintains a constant cutting depth over the curved surface.

THe operation of the machine tool is regulated by a control system which regulates the relative movement of the cutting tool and workpiece along the three axes in both amount and rate or velocity. The control system usually utilizes electronic digital control circuitry and techniques, termed in the art "numerical control" to regulate the operation of the machine tool so as to conduct the machining operations in accordance with a predetermined sequential plan. Such a sequential plan is often termed a "program" and is encoded on a medium, such as punched or magnetic tape.

In the past, it has been customary to provide numerical control to each of the three axes of the machine tool, thereby providing complete flexibility to the operation of the tool. However, programming a three or more axes machine tool to machine parts requiring three or more axes of motion simultaneously is very expensive when the tool path is generating a nonlinear curve as in the letter "0." This is particularly true in the case of applications in which the movement of the elements of the machine tool in one of the axes is uniform or repetitious. The numerical control would not require programming in this axis except for the fact that such programming must be done in order to obtain proper operation of the control system and the machine tool.

SUMMARY OF THE PRESENT INVENTION

It is therefore, the object of the present invention to provide a control system for a machine tool which eliminates the need for providing numerical control for all three axes of the machine tool in instances in which the movement of the machine tool elements is repetitious along one of the axes. The control system of the present invention provides such elimination of the numerical control of one of the axes by incorporating tracer control apparatus for that axis of the machine tool.

The control system thus includes a numerical control for controlling movement of the machine tool elements along two of the axes of the machine tool. The control system further includes a tracer control, operable by the numerical control for controlling the machine tool elements along the third axis.

BRIEF DESCRIPTION OF THE DRAWING

FIG. 2 is a side view of the machine tool of FIG. 1; and

FIG. 3 is a schematic diagram of the control system of the present invention.

DESCRIPTION OF THE PREFERRED EMBODIMENT

The Machine Tool

Figure 1:
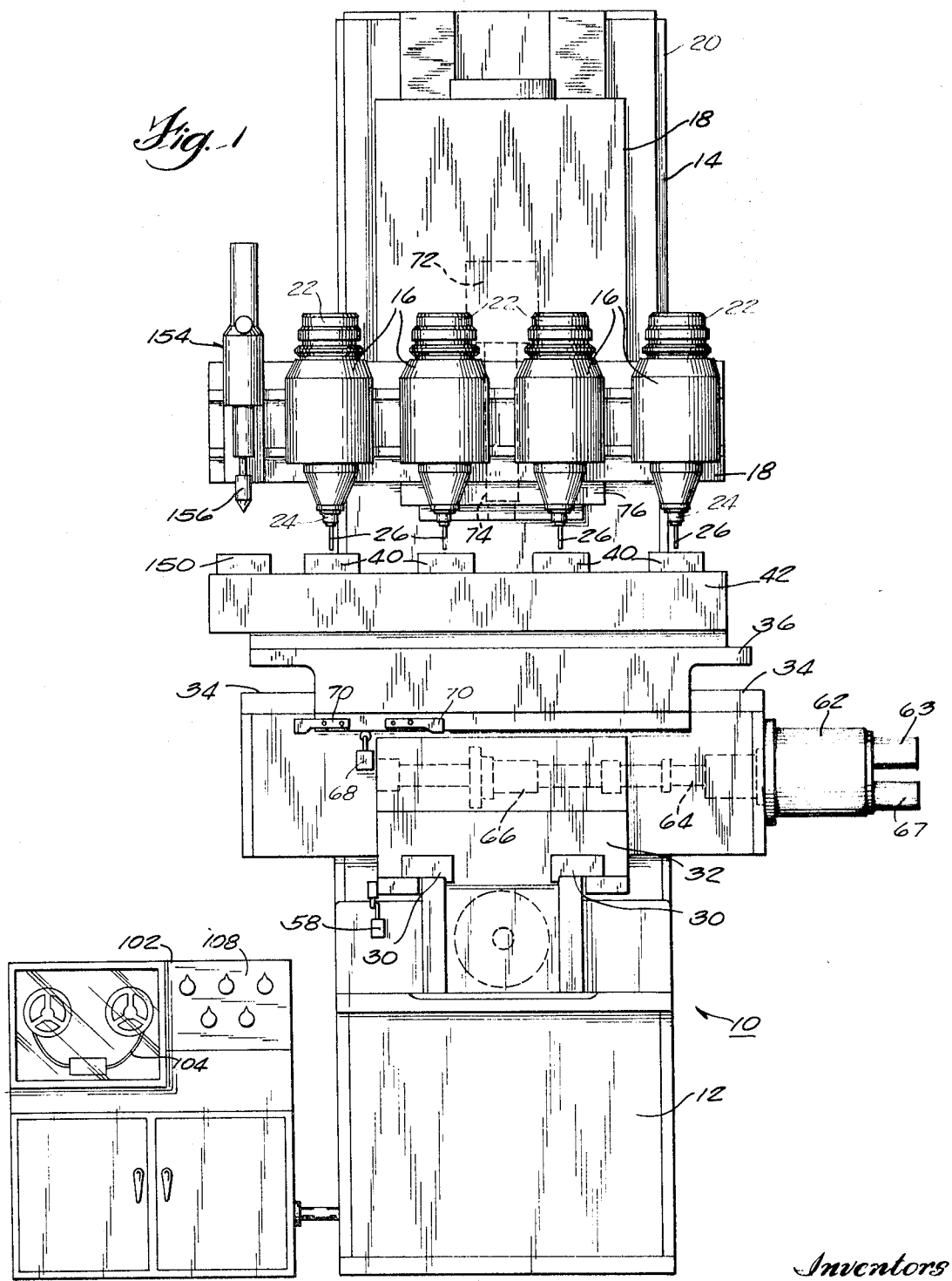
FIG. 1 is a front view of a machine tool which the control system of the present invention may be used.

Referring now to FIG. 1, there is shown therein a machine tool 10 with which the control system of the present invention may be utilized. Machine tool 10 has a base 12 for mounting the machine tool on the floor of the work area. Vertical column 14 is mounted on the rear of base 12. A plurality of spindleheads 16 are positioned on member 18 slideably mounted on ways 20 located on the front of column 14 for vertical movement up and down the column. Such movement is along the Z-axis of the machine tool. A plurality of spindleheads are provided to permit a large number of work pieces to be machined during each cycle. Each of spindleheads 16 contains a motor 22 for driving tool chuck 24 suitable for gripping and retaining tools, shown as mills 26. Base 12 contains a second pair of ways 30 positioned in front of column 14. Saddle 32 is slideably mounted on ways 30 for the horizontal movement toward and away from column 14. Such to and from movement is along the Y-axis of machine tool 10.

Saddle 32 also contains a pair of ways 34. A worktable 36 is mounted on ways 34 for movement left and right in front of column 14. Such left and right movement of worktable 36 along ways 34 has been termed movement along the X-axis of machine tool 10.

Workpieces 40 are mounted below spindlehead 16 on worktable 36 by means of standard 42.

Movement of member 18 up and down ways 20 of the Z-axis of machine tool 10, movement of saddle 32 toward and away from column 14 along ways 30 and the Y-axis of machine tool 10, and movement of work table 36 left and right in front of column 14 along ways 34 and the X-axis of the machine tool may be accomplished by the use of drive means such as electric or hydraulic motors. For example, hydraulic motor 50 mounted inside column 14 is connected to lead screw 52 journaled in the base 12 through coupling 54. Lead screw 52 extends through nut housing 56. See FIG. 2. Rotation of lead screw 52 in nut housing 56 by hydraulic motor 50 causes saddle 32 to move along ways 30. The amount of travel of saddle 32 along the ways is controlled by limit switch 58 and cams 60. A feedback tachometer 61 coupled to hydraulic motor 50 provides a feedback signal corresponding to the speed and direction of the hydraulic motor. A position transducer 65 provides a feedback signal corresponding to the position of saddle 32 along the axis.

In a similar manner, hydraulic motor 62 including tachometer 63 and position transducer 67 is connected to lead screw 64 and nut housing 66 for moving worktable 36 along ways 34. The limit of movement of worktable 36 is controlled by limit switch 68 and cams 70. Hydraulic motor 72, see FIG. 1, is connected to lead screw 74 and nut housing 76 for moving member 18 along ways 20 and the Z-axis of machine tool 10.

A machine tool of the type described above is manufactured by the Gorton Machine Corporation, Racine, Wis., and identified as a Vertical Milling Machine.

The Control System

FIG. 3 shows the control system 11 of the present invention. Control system 11 includes a control 100 for regulating movement of the elements of machine tool 10 along two of the machine axes. These axes are shown as the X and Y in FIG. 3 in an exemplary manner. To provide the desired regulatory operation, control 100 utilizes electronic digital control techniques and may comprise a digital computer, presently termed in the art and herein, a numerical control.

Numerical control 100 includes a command section 102 for generating command signals to the remaining portions of the numerical control. These command signals may initiate from punched or magnetic tape 104 containing the program for machine tool 10. Tape 104 is read by reader 106. Alternately, the input may be generated by a manually operable means 108. In addition to generating signals controlling movement along the axes of machine tool 10, command section 102 provides signals controlling all other functions of the machine tool 10, such as the turn-on of coolants and lubricants and the starting and stopping of spindle motors 22.

The command signals are provided to an input section 110 which converts the signals into speed and position reference signals for the X and Y axes of the machine tool. These speed and position reference signals may be compared with speed and position feedback signals from tachometers 61 and 63 and position transducers 65 and 67 in output section 112 to provide error signals to motors 50 and 62. The error signals may be provided to servo valves 78 and 80 or other control devices for regulating the operation of hydraulic motors from hydraulic power source 84. Hydraulic power supply 84 supplies hydraulic fluid to servo valves 78, 80 and 82 which are electrically controlled metering devices for controlling the hydraulic fluid. Specifically, the speed and position feedback signals from tachometer 61 and position transducer 65 are provided to output section 112 in conductors 114 and 116, respectively, while error signal to servo valve 78 is provided in conductor 118. The speed and position feedback signals from tachometer 63 and position transducer 67 are provided to output section 112 in conductors 120 and 122, respectively, and an error signal is provided to servo valve 80 in conductor 124. Output section 112 also provides output signals in conductors 126 and 128 which control the turn-on and turnoff of coolants, lubricants, spindle motors 22, and the like.

A numerical control of the type which may be incorporated in the control system of the present invention is manufactured by the Bunker-Ramo Corporation under the model designation 3100.

Tracer control 140 incorporated in control system 11 of the present invention is employed in conjunction with a model 150 which has a shape identical to, or a replica of, workpiece 40. Model 150 is mounted on worktable 36 by standard 42. A transducer or input head 154 is mounted on member 18 above model 150. Such an input head typically includes a sensor 156 adapted to be placed in contact with the surface of model 150 to be traced, in the present exemplary instance, concave surface 158. Sensor 156 also includes a variable differential transformer 160. Variable transformer 160 includes a primary winding 162 which is energized by a power source 163 of the alternating-current type, such as an oscillator. The coupling between primary winding 152 and secondary winding 164 of transformer 160 is controlled by sensor 156 in contact with surface 158 of model 150. The output signal of input head 154 in secondary winding 164 is provided to a demodulator 166 by conductor 168. Demodulator 166 removes the alternating component from the output signal of input head 154 and provides an error signal to servoamplifier 170. Servoamplifier 170 provides an output signal to servo valve 82 in conductor 172 which controls hydraulic motor 72 and the movement of member 18 along the Z-axis of the machine tool so that the movement of member 18 and spindleheads 16 in the Z-axis corresponds to the Z-axis movements of sensor 156 on surface 158 of model 150. A typical tracer control which may be incorporated in the control system of the present invention is that made and sold by the Pegasus Division of Koehring Company, Milwaukee, Wis., under the model designation Pegasus 541.

While an electromechanical tracer control has been described, supra, in an exemplary manner, it will be appreciated that hydraulic, pneumatic, optical, or other suitable devices may be utilized in tracer control.

Operation

Model 150 is mounted on standard 42 below sensor 156 of input head 154. Workpieces 40 are mounted on standard 42 below spindleheads 16. It will be appreciated that for high-volume, high-speed production, magazines may be provided on worktable 36 for automatically positioning work pieces 40 under the spindleheads and removing the finished workpieces.

The desired cutting tool is placed in chuck 24. In this exemplary description of the operation of control system 11, in which letter or number characters are to be engraved on the surface of pushbutton workpieces 40, milling cutter 26 is placed in chuck 24.

The desired program is then entered into numerical control 100 as on tape 104. This program contains the necessary commands to the machine tool to form the desired letters and numbers. For example, the program may command saddle 32 to move along ways 30 and the Y-axis of machine tool 10 a prescribed distance and subsequently command the worktable to move along ways 34 and the X-axis a shorter distance so that the letter L is formed on the surface of the pushbutton when router 26 is placed in contact therewith.

The program on tape 104 also provides signals in conductor 174 to tracer control 140 to initiate and stop the operation of the tracer control and to engage and retract sensor 156 from concave surface 158.

Numerical control 100 causes the elements of machine tool 10 to move along the X and Y axes so that the spindle heads are located over the points on workpieces 40 at which the engraving operation is to commence. Numerical control 100 then provides a signal in conductor 174 which commands sensor 156 of the tracer control to move into contact with surface 158 of model 150. The movement of sensor 156 also causes member 18 and spindle heads 16 to move along the Z-axis toward workpieces 40. A slight offset may be provided in tracer control 140 so that when sensor 156 comes in contact with surface 158, routers 26 will have penetrated 0.010 to 0.015 inch into the surfaces of workpieces 40.

The program of numerical control 100 then causes movement of the saddle and worktable along the X and Y axes as described above to engrave the characters on the surfaces of workpieces 40.

As worktable 36 moves along the Y-axis, tracer control 140 automatically controls the movement of spindle heads 16 along the Z-axis to accommodate the curvatures in the workpieces appearing along the Z-axis. Thus, the Z-axis will move under control of the tracer during this operation to maintain a constant depth of cut. This is done automatically and without the necessity of programming tape 104 for commanding movement of machine tool 10 on the Z-axis thereby lending a simplicity heretofore unobtainable in the operation of machine tool 10 and the control system therefor.

When the engraving of one character is completed, numerical control 100 commands tracer control 140 to disengage the surface of model 150 removing cutters 26 from the surfaces of workpieces 40. Numerical control 100 commands the elements of machine tool 10 to move along the X and Y axes to the next location at which a character is to be formed. The operation of the control system is then repeated to form the next character.

We claim:

1. A control system for a machine tool having three mutually perpendicular axes along which elements of the machine tool are movable, said control system having numerical control means for controlling movement of one of the machine tool elements along two of the axes, said control system further having tracer control means coupled to and operable by said numerical control means for controlling a second of the machine tool elements along the third axis.

2. The control system according to claim 1 wherein said numerical control means includes means for sequentially controlling the movement of the machine tool elements along two of said axes and controlling said tracer control in accordance with a predetermined plan.

3. The control system according to claim 1 wherein said machine tool provides machining operations on one or more workpieces and includes a model contoured to the desired form of said workpiece along the third axis, and wherein said tracer control of said control system includes sensory means for cooperable association with said model, said tracer control causing said machine tool elements to follow the third axis path of said sensory means on said model.

4. The control system according to claim 3 wherein said machine tool includes drive means for moving the machine tool elements along the third axis and wherein said tracer control is connected to said drive means and provides an output thereto responsive to its cooperable association with said model for causing the machine tool elements to follow the third axis path of said sensory means on said model.

5. In combination, a machine tool having three mutually perpendicular axes along which elements of the machine tool are movable, said machine tool having drive means for moving said elements along said axes; and a control system having numerical control means coupled to two of said drive means for controlling the movement of said machine tool elements along said two axes, said control system further having tracer control means coupled to said numerical control means and to the third of said drive means, said tracer control means being operable by said numerical control means for controlling the machine tool elements along the third axis.

6. The combination of claim 5 wherein said machine tool provides machining operations along said axes to one or more workpieces and includes a model contoured to the desired form of said workpiece along the third axis, and wherein said tracer control of said control system includes sensory means for cooperable association with said model said sensory means being coupled to the third of said drive means for operating said third drive means to cause said machine tool elements to follow the third axis path of said sensory means on said model.